United States Patent [19]
Crain, Jr.

[11] 3,760,499
[45] Sept. 25, 1973

[54] APPARATUS FOR CUTTING PLUGS FROM CARPETS

[75] Inventor: Millard Crain, Jr., San Jose, Calif.

[73] Assignee: Crain Cutter Company, Santa Clara, Calif.

[22] Filed: Oct. 20, 1971

[21] Appl. No.: 190,824

Related U.S. Application Data

[63] Continuation of Ser. No. 11,274, Feb. 13, 1970, abandoned.

[52] U.S. Cl. .................................................. 30/130
[51] Int. Cl. .............................................. B26b 3/08
[58] Field of Search .......................... 30/130, 301

[56] References Cited
UNITED STATES PATENTS
1,080,312  12/1913  Wehner .............................. 30/130
1,692,436  11/1928  Deane ................................ 30/130
3,171,200  3/1965  Poppenga ........................... 30/130

Primary Examiner—James L. Jones, Jr.
Assistant Examiner—J. C. Peters
Attorney—Jack M. Wiseman

[57] ABSTRACT

An apparatus for repairing carpets and similar materials wherein a segment of the damaged carpet to be replaced is anchored in place and held stationary, a cutter is then rotated about the outer periphery of said anchored damaged segment and simultaneously urged through the carpet along the longitudinal axis of the cutter cutting said carpet about the periphery of the anchored segment.

9 Claims, 3 Drawing Figures

INVENTOR.
MILLARD CRAIN JR.

BY Jack M. Wiseman
ATTORNEYS 3,760,499

APPARATUS FOR CUTTING PLUGS FROM CARPETS

RELATED CASE

This application is a continuation of application Ser. No. 11,274, filed Feb. 13, 1970, now abandoned, by Millard Crain, Jr., for Method And Apparatus For Cutting Plugs From Carpets.

BACKGROUND OF THE INVENTION

The present invention pertains to apparatus for mending carpets or the like. It is common for isolated segments of carpets within offices, homes, et cetera to become burned or stained thereby making it desirable to replace said segments. Various approaches have been taken, one of which is disclosed in U. S. Pat. No. 3,171,200, granted to R.J. Poppenga on March 2, 1965. The patented approach relates to anchoring a segment of the carpet and establishing a circular cutting blade of desired diameter on a support structure. The structure is then dealt a blow, which transmits force to the blade forcing the cutting edge in the axial direction through the carpet. Simultaneously, the anchor moves with the blow. As a consequence thereof, the cutting blade becomes dull prematurely. It appears that unless one is skilled in using the apparatus disclosed in the prior art, the carpet would have a tendency due to the resiliency of the carpet and underlayment to "bunch-up" about the cutting edge and an imperfect circle would often result. Accordingly, it becomes relatively difficult to remove and replace a carpet segment employing prior art apparatus. Skilled, experienced persons were needed to perform the task. Cutting tools or coring devices with serrated edges are shown in U. S. Pat. Nos. 2,564,451 and 2,683,312.

SUMMARY OF THE PRESENT INVENTION

The present invention teaches an apparatus for removing segments of carpets or the like. The individual performing the operation need not be experienced and skilled in any particular way. The segment of the damaged carpet to be removed is anchored in place. An annular cutting blade is then rotated about the anchor. The rotation may be imparted through the hand of an individual in a twisting motion of clockwise direction and counterclockwise direction. The blade of the present invention retains its sharp cutting edge over an extended period of time.

Exemplary apparatus for practicing the present invention may include an anchor with carpet engaging pins protruding therefrom. An annular cutting blade disposed coaxially with the anchor is supported for rotation about the periphery of the anchor such that the anchor remains static during the rotary cutting action.

DESCRIPTION OF PREFERRED EMBODIMENT

Figure 1:
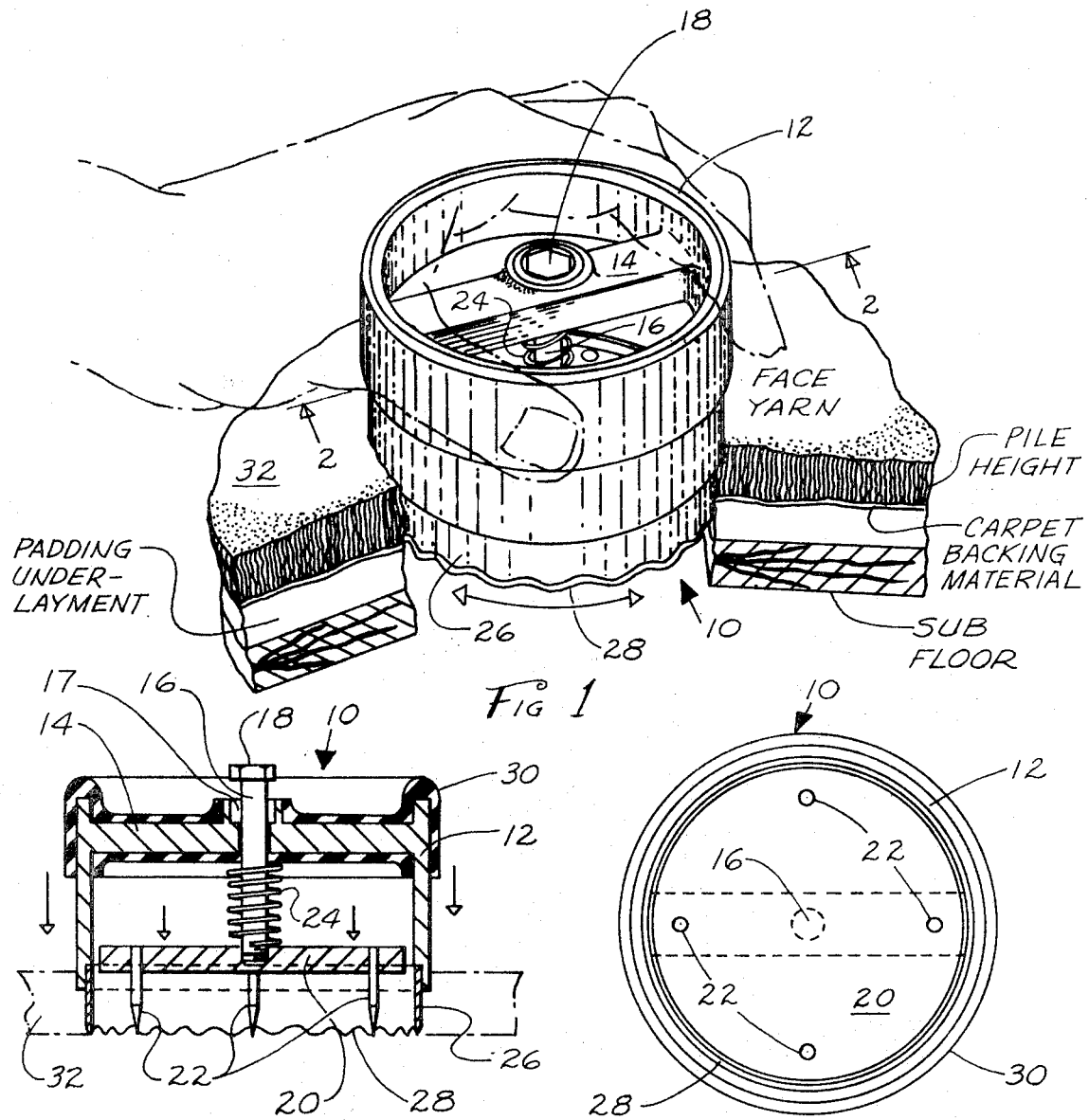
FIG. 1 is a perspective view of the apparatus of the present invention when in use and illustrated with a diagrammatic view of a carpet flooring section.
Figure 2:
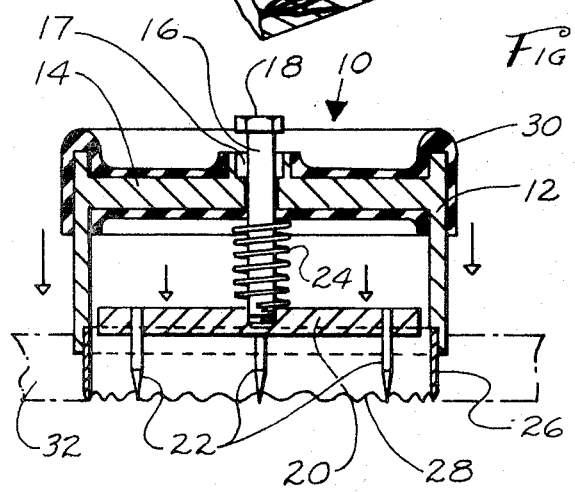
FIG. 2 is a cross-sectional view of the apparatus taken along the line 2—2.
Figure 3:
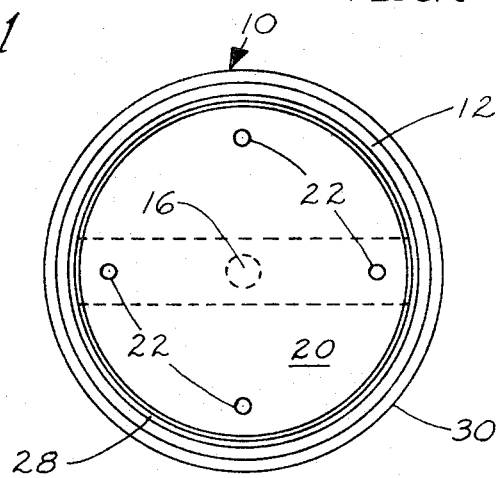
FIG. 3 is a bottom view of the apparatus of FIGS. 1 and 2.

The drawings depict an apparatus, referred to by the general reference character 10, and incorporating the teachings of the present invention. The apparatus 10 includes a cylindrical housing 12. Fixed to the upper portion of the housing 12 is a handle in the form of a diametrically disposed handlebar 14. Passing through the center of the handlebar 14 and coaxial with the housing 12 as well as the handlebar 14 is a rotatable shaft 16 with a hexogonally shaped head 18. The handlebar 14 is formed with a recess 17 adapted to receive the head 18. Thus, the shaft 16 forms a guide along which the handlebar 14 along with the housing 12 is slideable in the axial direction.

The opposite ends of the shaft 16 is threaded in engagement with a circular disc 20 carrying a set of carpet engaging pins 22, which in the preferred embodiment are four. The pins 22 protrude from the disc 20 at equal radial distances from the axis of rotation of the shaft 16 to engage and impale the textured face of the damaged carpet segment. The disc 20 is disposed coaxial with the housing 12 and the shaft 16. About the shaft 16, intermediate the disc 20 and the handlebar 14, is a helical coil bias spring 24. The bias of the spring 24 through its compressive action continuously urges the disc 20 away from the handlebar 14 and the housing 12 in the axial direction and into continuous engagement with the portion of the carpet impaled the damaged carpet to be cut to the underlayment padding and hold it stationary during the cutting operation.

Fixed to the lower edge of the housing 12 is an annular or cylindrical cutting blade 26 having a wavy cutting edge 28 with a plurality of concave cutting edges. In the preferred embodiment, each concave cutting edges. In the preferred embodiment, each concave cutting edge is one-half inch between peaks. The blade 26 is secured to the housing 12 in fixed relation and is coaxial with the disc 20, the housing 12 and the shaft 16. Near the upper portion of the housing 12 and about the handlebar 14 is a coating 30 of a resilient plastic material adapted to provide frictional contact between the apparatus 10 and the hand of an individual to reduce slippage.

According to the present invention, to remove a plug or segment of a carpet 32, the apparatus 10 is centered over the damaged segment of the carpet to be removed with the disc 20 facing the carpet's topmost face yarns. The stabilizing carpet engaging pins 22 penetrate through the face yarns and down through the carpet's pile height and the backing material of the carpet under a downward force manually applied to the handlebar 14 which is transmitted to the disc 20 through the spring 24. In this manner, the plug to be cut is pinned to the padding underlayment. The pins 22 hold the carpet segment to be removed stationary and also hold the disc 20 stationary or static to stabilize the apparatus 10. The operator then grasps the housing 12 about the coating material 30 and/or the handlebar 14 rotating the housing 12 about the shaft 16 and simultaneously applying force in an axial direction toward the carpeting such that the blade edge 28 cuts the carpeting about the periphery of the disc 20. Once the cut is complete, the individual releases the force applied to the housing 12 and entire apparatus 10 may then be raised. The pins 22 retains the plug or severed segment adjacent the disc. A new piece of matching carpet may then be cut by the same apparatus 10 and inserted in the void spot.

Accordingly, there is herein disclosed a method of for removing a segment of a carpeting in a simplified manner and adapted to be performed by a compact apparatus. The entire operation may be conducted by one hand with a tool of a relatively small size.

I claim:

1. Apparatus for severing and removing segments of carpeting comprising, in combination:
    a housing;
    a shaft supported within the housing, said housing being rotatable about the axis of said shaft;
    an anchor member fixedly supported by said shaft at the distal end of said shaft, said anchor member having carpet engaging pins for engaging a segment of carpeting to hold said segment of carpeting in a stationary position;
    a cutting blade fixedly supported by said housing for rotation therewith and rotatable relative to said anchor member about the axis of said shaft, said blade being adapted to cut the segment of carpeting about the periphery of said anchor member while said anchor member holds the segment of carpeting in a stationary position; and
    a spring intermediate said anchor member and said housing, said spring being biased through its compressive action to continuously urge said anchor member into engagement with the segment of carpeting while said cutting blade rotates with said housing about the axis of said shaft.

2. Apparatus as claimed in claim 1 in which:
    said spring is in the form of a helical coil surrounding said shaft intermediate said anchor member and said housing.

3. Apparatus as claimed in claim 2 in which:
    said housing is formed with a handle to be grasped manually by an operator for transmitting a force through said spring to said anchor member to urge said carpet engaging pins into the segment of the carpet and for rotating said housing to impart a rotating cutting action to said cutting blade.

4. Apparatus as claimed in claim 3 in which:
    said cutting blade has a cutting edge with periodic variations.

5. Apparatus as claimed in claim 3 in which:
    said cutting blade has a wavy cutting edge.

6. Apparatus as claimed in claim 4 in which:
    said anchor member has a disc configuration and said cutting blade has an annular configuration, said cutting blade being formed with a diameter greater than the diameter of said anchor member and being coaxial therewith.

7. Apparatus as claimed in claim 6 in which:
    said housing has a cylindrical configuration disposed coaxially with said cutting blade, said anchor member and said shaft, said housing being slidable along said shaft in the direction of the axis of said shaft.

8. Apparatus as claimed in claim 7 in which:
    said handle forms a guide slidable along said shaft in the direction of the axis of said shaft.

9. Apparatus as claimed in claim 8 in which:
    said carpet engaging pins depend from said anchor members at equal radial distances from the axis of said shaft.

* * * * *